(12) United States Patent
Mortun et al.

(10) Patent No.: US 9,843,144 B2
(45) Date of Patent: Dec. 12, 2017

(54) ELECTRICAL DEVICES WITH LONGITUDINAL ELECTRICAL CONDUCTOR ENTRIES

(71) Applicant: Hubbell Incorporated, Shelton, CT (US)

(72) Inventors: Sorin Ioan Mortun, Irvington, NY (US); John Joseph Putorti, Seymour, CT (US)

(73) Assignee: Hubbell Incorporated, Shelton, CT (US)

( * ) Notice: Subject to any disclaimer, the term of this patent is extended or adjusted under 35 U.S.C. 154(b) by 0 days.

(21) Appl. No.: 14/950,223

(22) Filed: Nov. 24, 2015

(65) Prior Publication Data

US 2016/0149354 A1     May 26, 2016

Related U.S. Application Data

(60) Provisional application No. 62/084,798, filed on Nov. 26, 2014.

(51) Int. Cl.

| | |
|---|---|
| *H01R 13/60* | (2006.01) |
| *H01R 13/713* | (2006.01) |
| *H01R 25/00* | (2006.01) |
| *H01R 24/62* | (2011.01) |
| *H01R 107/00* | (2006.01) |
| *H02G 3/16* | (2006.01) |
| *H01H 83/02* | (2006.01) |
| *H01R 13/447* | (2006.01) |

(52) U.S. Cl.
CPC ......... *H01R 13/7135* (2013.01); *H01R 24/62* (2013.01); *H01R 25/006* (2013.01); *H01H 83/02* (2013.01); *H01R 13/447* (2013.01); *H01R 2107/00* (2013.01); *H02G 3/16* (2013.01)

(58) Field of Classification Search
CPC ...... H01H 83/02; H01R 13/7135; H01G 3/16; H02G 3/16
USPC ............................................. 439/536; 174/58
See application file for complete search history.

(56) References Cited

U.S. PATENT DOCUMENTS 3,187,084 A * 6/1965 Stillman ................ H02G 3/086
                                                        174/53
4,500,746 A * 2/1985 Meehan ................ H01H 23/04
                                                        174/503

(Continued)

OTHER PUBLICATIONS

PCT International Search Report and Written Opinion dated Mar. 2, 2016 from corresponding Application No. PCT/US2015/062450, 10 pages.

*Primary Examiner* — Tho D Ta
(74) *Attorney, Agent, or Firm* — Wissing Miller LLP

(57) ABSTRACT

An electrical wiring device has a longitudinal axis extending between a top surface and a bottom surface. The electrical wiring device includes at least one line phase wiring terminal, at least one neutral wiring terminal, at least one line phase electrical conductor entry extending along the longitudinal axis of the electrical wiring device and extending between the line phase wiring terminal and the top surface or the bottom surface of the electrical wiring device and at least one neutral electrical conductor entry extending along the longitudinal axis of the electrical wiring device and extending between the neutral wiring terminal and the top surface or the bottom surface of the electrical wiring device.

35 Claims, 12 Drawing Sheets

(56) References Cited

U.S. PATENT DOCUMENTS

| | | | |
|---|---|---|---|
| 5,471,012 A * | 11/1995 | Opel | H02G 3/16 174/53 |
| 5,594,398 A | 1/1997 | Marcou et al. | |
| 7,439,832 B1 | 10/2008 | Radosavljevic et al. | |
| 7,510,429 B1 * | 3/2009 | Savicki, Jr. | H01R 25/003 174/53 |
| 7,736,174 B2 | 6/2010 | Bhosale et al. | |
| 8,035,029 B2 * | 10/2011 | Mullen | H02G 3/088 174/50 |
| 8,344,250 B2 | 1/2013 | Padro | |
| 2013/0280956 A1 | 10/2013 | Cheng et al. | |

* cited by examiner

ELECTRICAL DEVICES WITH LONGITUDINAL ELECTRICAL CONDUCTOR ENTRIES

CROSS-REFERENCE TO RELATED APPLICATION

The present disclosure is based on and claims benefit from U.S. Provisional Application Ser. No. 62/084,798 filed Nov. 26, 2014 entitled "Electrical Devices with Longitudinal Electrical Conductor Entries", the entire contents of which are herein incorporated by reference.

BACKGROUND

Field

The present disclosure relates generally to electrical devices, and more particularly to electrical devices with longitudinal electrical conductor entries.

Description of the Related Art

Electrical distribution systems deliver power throughout a building from a power source to electrical wiring devices. Electrical wiring devices are connected to the electrical distribution system by way of wiring terminals, and deliver power from the power source to a load, or control the power to a load. One or more electrical wiring devices can be mounted to a device box depending on the size of the device box. Once the electrical wiring device is installed inside a device box, a cover plate is disposed over the electrical wiring device to complete the installation. Electrical wiring devices may include, for example, receptacles, switches, fault circuit interrupters, such as ground fault circuit interrupters and arc fault circuit interrupters, transient surge suppressors, such as transient voltage surge suppressors, occupancy sensors, dimmers, timers, and low voltage devices, such as USB chargers, etc.

Generally, the wiring terminals used to connect the electrical wiring devices to the electrical distribution system can be made via binding screws, which may be color coded to meet electrical codes. There may be one or more binding screws for a line side phase (or hot) connections, one or more binding screws for a neutral connections, and a binding screw for a ground connection, which may be connected to the yoke or mounting strap of the electrical wiring device. As an example, for a duplex receptacle there would generally be two binding screws for the line phase connection, two binding screws for the neutral connection, and a binding screw on the yoke for the ground connection. In such duplex receptacles, the binding screws for the line side phase connection are generally on one side of the receptacle, and the binding screws for the neutral connection are generally on the other side of the receptacle. The line side phase binding screws connect to one or more line side phase conductors of the electrical distribution system, e.g. a household wiring system. The neutral binding screws connect to one or more neutral conductors of the electrical distribution system, and the ground binding screw connects to the ground conductor of the electrical distribution system.

To connect the conductors to the wiring terminals, many commercially available electrical devices have apertures in a rear surface of the device for receiving such conductors for connection to the wiring terminals. As a result, conductors connected to the wiring terminal extend perpendicular to the longitudinal axis of the electrical wiring device creating a large, obtrusive device footprint making it difficult to use such electrical wiring devices in wiring boxes, wiring raceways or other spaces that are not sufficiently deep to easily install and retain the electrical wiring devices.

SUMMARY

An electrical wiring device has a longitudinal axis extending between a top surface and a bottom surface. The electrical wiring device includes at least one line phase wiring terminal, at least one neutral wiring terminal, at least one line phase electrical conductor entry extending along the longitudinal axis of the electrical wiring device and extending between the line phase wiring terminal and the top surface or the bottom surface of the electrical wiring device and at least one neutral electrical conductor entry extending along the longitudinal axis of the electrical wiring device and extending between the neutral wiring terminal and the top surface or the bottom surface of the electrical wiring device.

An electrical wiring device has a longitudinal axis extending between a top surface and a bottom surface. The electrical wiring device includes a plurality of wiring terminals and a plurality of electrical conductor entries extending along the longitudinal axis of the electrical wiring device, wherein at least one of the plurality of electrical conductor entries extends between one of the plurality of wiring terminals and the top surface, and wherein at least one of the plurality of electrical conductor entries extends between one of the plurality of wiring terminals and the bottom surface.

BRIEF DESCRIPTION OF THE DRAWINGS

A more complete appreciation of the present disclosure and many of the attendant advantages thereof will be readily obtained as the same becomes better understood by reference to the following detailed description when considered in connection with the accompanying drawings, wherein.

DETAILED DESCRIPTION

Figure 1:
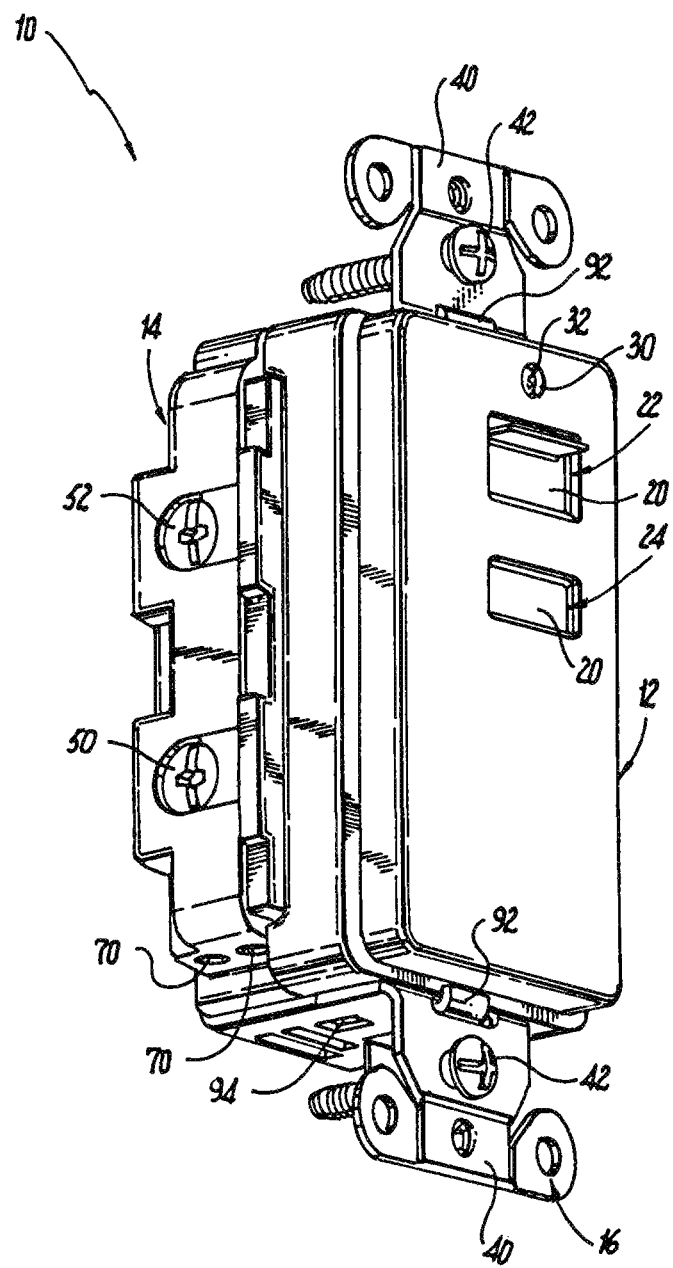
FIG. 1 is a perspective view of an exemplary embodiment of an USB charger as an electrical wiring device according to an illustrative embodiment of the present disclosure.

The present disclosure relates generally to electrical devices, and more particularly to electrical devices with longitudinal wiring entries or what may be referred to as electrical devices with bi-directional clamp wiring. FIGS. 1-11 provide an exemplary embodiment of an electrical wiring device configured with longitudinal entries so that electrical conductors can connect to wiring terminals in a path parallel to a longitudinal axis of the electrical wiring device. As described with respect to FIG. 3, the longitudinal axis (A-A) extends from a top surface 93 of the electrical device to a bottom surface 95 of the electrical device. Of course, top and bottom as used herein are for ease of description of the longitudinal axis and do not necessarily describe any particular physical orientation of the device in use According to an embodiment of the present disclosure, the electrical wiring device has a cover, and a base with at least one line phase wiring terminal and at least one neutral wiring terminal. The base has at least one line phase electrical conductor entry extending along a longitudinal axis of the electrical wiring device and extending between the line phase wiring terminal and a top or bottom surface of the electrical wiring device. The base may also have at least one neutral electrical conductor entry extending along a longitudinal axis of the electrical wiring device and extending between the neutral wiring terminal and a top or bottom surface of the electrical wiring device. Preferably, the at least one line phase electrical conductor entry extends between the line phase wiring terminal and the bottom surface of the electrical wiring device, and the at least one neutral electrical conductor entry extends between the neutral wiring terminal and the top surface of the electrical wiring device. In some embodiments, the at least one line phase electrical conductor entry includes two line phase electrical conductor entries, and the at least one neutral electrical conductor entry comprises two neutral electrical conductor entries. According to an embodiment, the electrical wiring device may further include a yoke extending from one portion of the cover around an outer surface of the base to another portion of the cover, and including a ground terminal. The yoke can be snap fitted to the cover and base to at least partially secure the cover to the base.

In another embodiment, the electrical wiring device has a cover and a base having a plurality of wiring terminals and a plurality of electrical conductor entries extending along a longitudinal axis of the electrical wiring device, wherein at least one of the plurality of electrical conductor entries extends between one of the plurality of wiring terminals and a top surface of the electrical wiring device, and wherein at least one of the plurality of electrical conductor entries extends between one of the plurality of wiring terminals and a bottom surface of the electrical wiring device. In some embodiments, the plurality of wiring terminals may include line phase and load phase wiring terminals, and the plurality of electrical conductor entries may include at least one line phase electrical conductor entry and at least one load phase electrical conductor entry. In some embodiments the plurality of wiring terminals may include line phase and neutral wiring terminals, and the plurality of electrical conductor entries may include at least one line phase electrical conductor entry and at least one neutral electrical conductor entry. According to an embodiment of the present disclosure, the electrical wiring device may also include a yoke extending from one portion of the cover around an outer surface of the base to another portion of the cover, and including a ground terminal. The yoke can be snap fitted to the cover and base to at least partially secure the cover to the base.

According to an embodiment of the present disclosure, the electrical wiring device is a USB charger having two ports for facilitating connections between the USB charging assembly within the electrical wiring device and to two external USB devices. However, it should be appreciated that any electrical wiring device may be configured with the disclosed longitudinal entries for connecting electrical conductors to the wiring terminals. Examples of such electrical wiring devices include receptacles, switches, circuit interrupters (e.g., ground fault circuit interrupters and arc fault circuit interrupters), transient surge suppressors (e.g., transient voltage surge suppressors), occupancy sensors, dimmers, timers, low voltage devices, including the USB charger disclosed herein, and combinations of the different devices, such as a combination receptacle and USB charger, etc.

Figure 2:
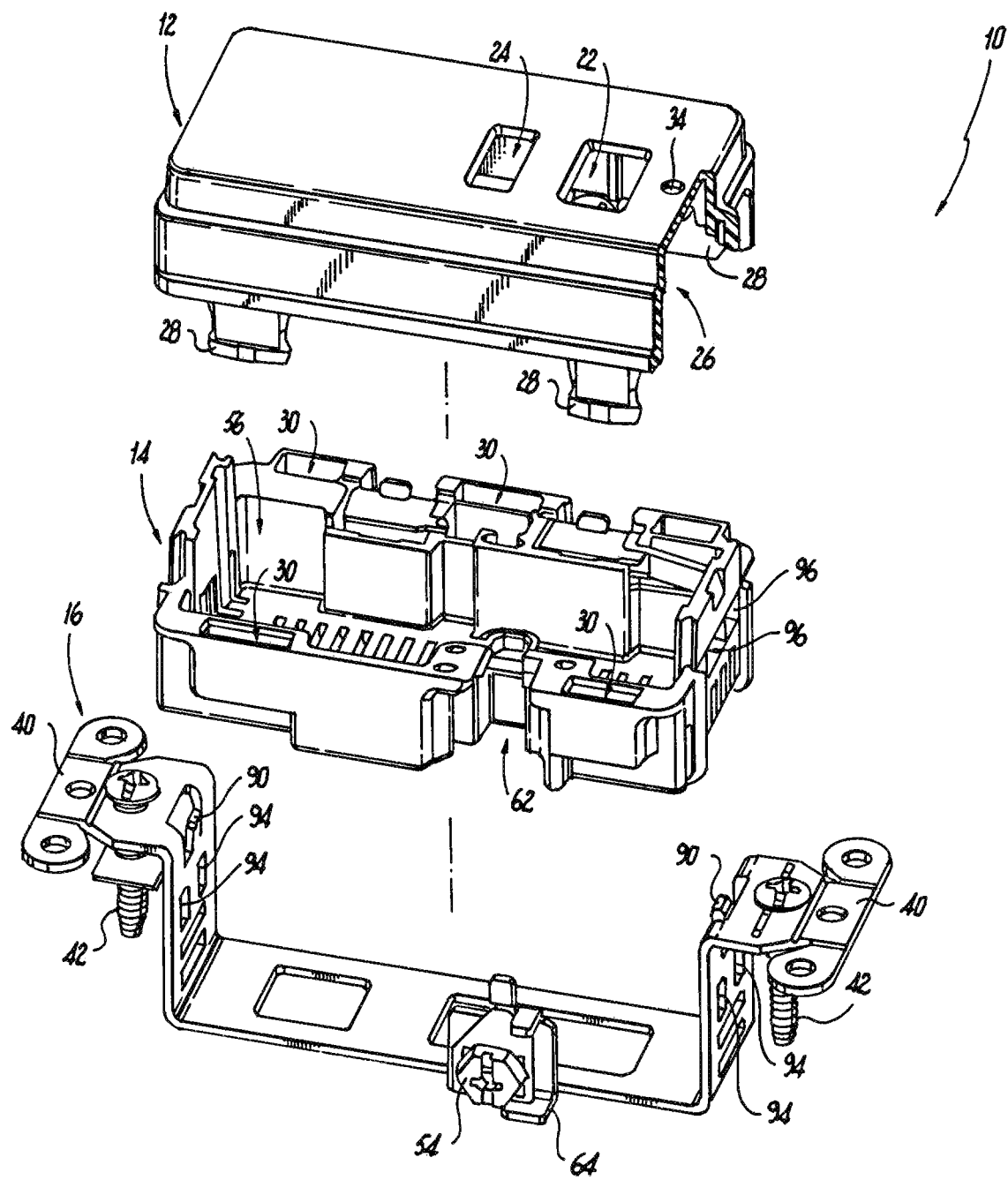
FIG. 2 is a perspective view of the electrical wiring device of FIG. 1 according to an illustrative embodiment of the present disclosure with a cover separated from a base and separated from a yoke, the cover shown in partial cut-away view for description purposes only.
Figure 3:
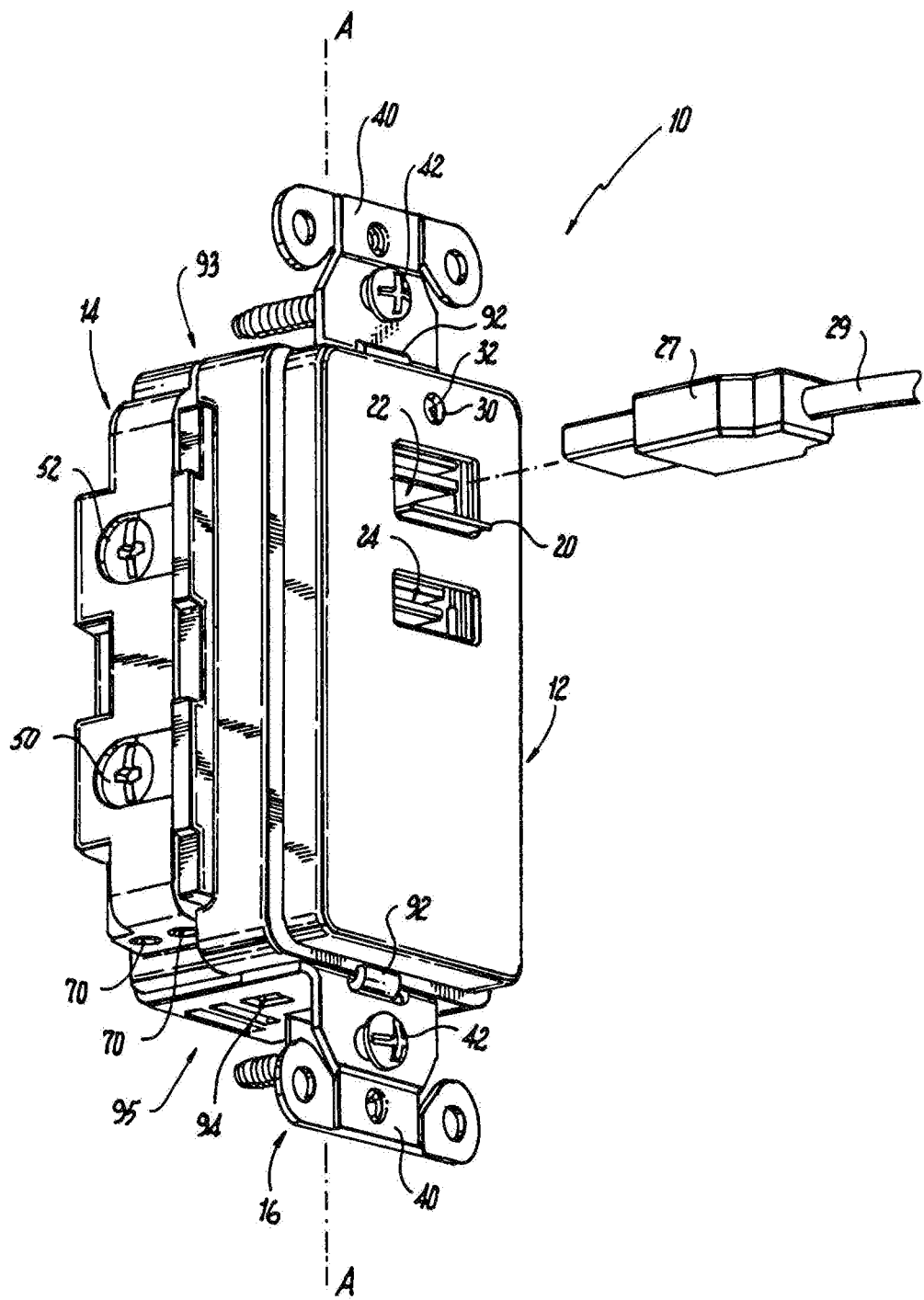
FIG. 3 is a perspective view of the electrical wiring device of FIG. 1, illustrating a USB cover in an open position and a USB connector ready for insertion into a USB charging assembly according to an illustrative embodiment of the present disclosure.

Turning to the figures and in particular FIGS. 1-3, the electrical wiring device 10 includes a cover 12, a base 14, and a yoke 16. The cover 12 in this embodiment includes a door 20 covering USB ports 22 and 24. The door 20 is capable of moving between a closed position (shown in FIG. 1) and an open position (shown in FIG. 3). In the closed position, door 20 helps protect the USB charging assembly within the electrical wiring device from damage. The USB charging assembly may include USB connectors and charging circuitry, which are known in the art and not shown. An example of a USB charging assembly in an electrical wiring device is described in U.S. Pat. No. 8,758,031, which is incorporated herein in its entirety by reference.

Referring to FIG. 2, the cover 12 also has an open central interior portion 26 that forms in part an interior chamber that houses the internal components of the electrical wiring device, here the USB charging assembly, and will be described in more detail below. The cover 12 has one or more snap projections 28 configured to engage corresponding recesses 30 in base 14 such that when snap projections 28 are fully inserted into recesses 30, the cover 12 is at least partially secured to the base 14.

The cover 12 may also include an aperture 34 where an indicator 32 (e.g., an LED electrically connected to the charging circuitry) would be visible. For example, an illuminated LED may indicate that a device plugged into the USB charging assembly, via a USB cable including a USB connector 27 (FIG. 3) inserted into a USB port, e.g., port 22 or 24, is connected and charging. While the cover 12 for electrical wiring device according to this illustrative embodiment includes USB ports, it will be appreciated that the cover 12 can be configured in accordance with any type of electrical wiring device. For example, for a receptacle (e.g., a single or duplex receptacle), the cover will include apertures or slots configured to receive blades of a plug. For a switch, the cover will include an opening for the toggle arm of the switch assembly within the interior chamber to pass through the cover.

Figure 6:
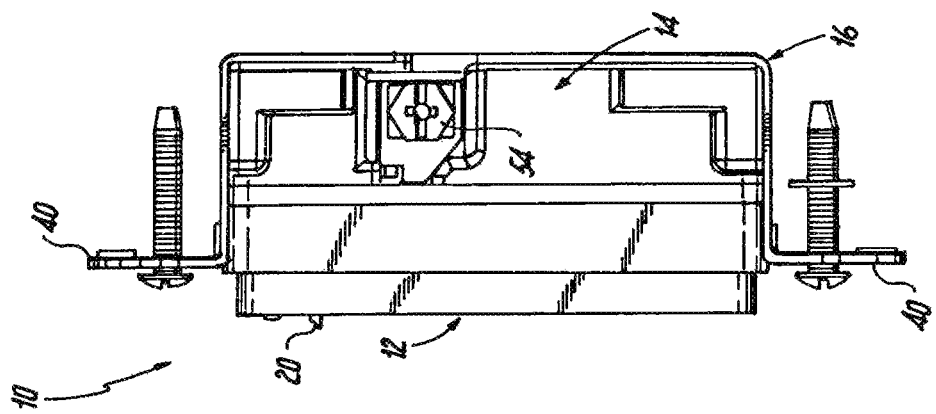
FIG. 6 is a view from a second side of the electrical wiring device of FIG. 1, illustrating a ground wiring terminal according to an illustrative embodiment of the present disclosure.
Figure 5:
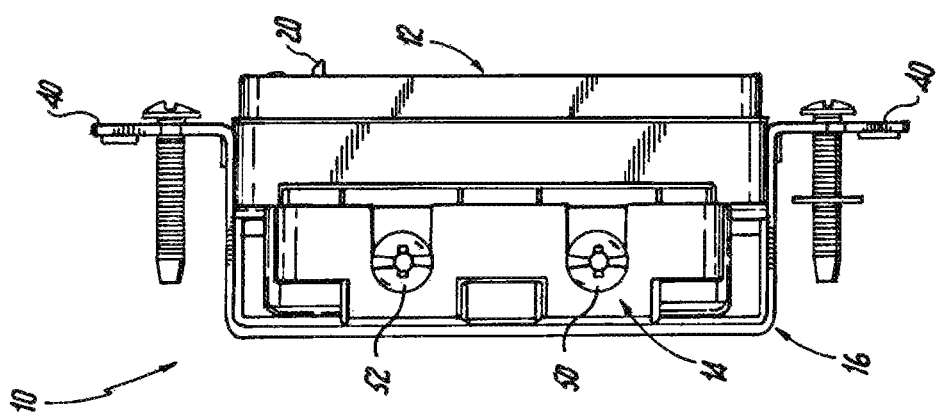
FIG. 5 is a view from a first side of the electrical wiring device of FIG. 1, illustrating line phase and neutral wiring terminals according to an illustrative embodiment of the present disclosure.
Figure 4:
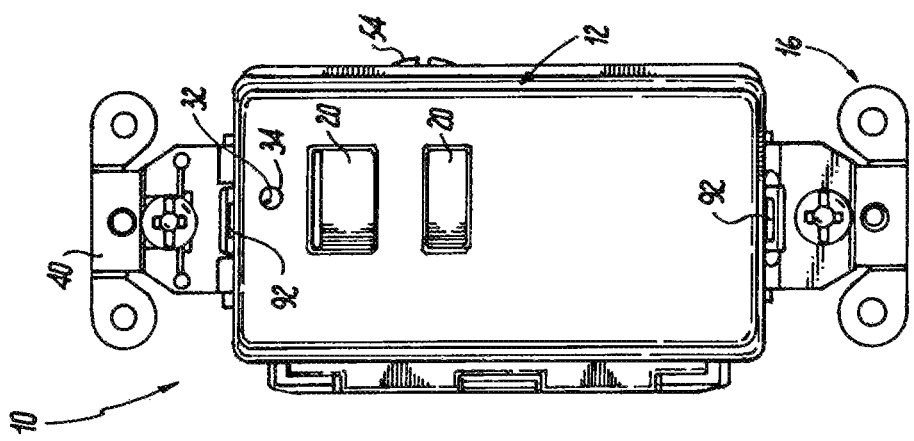
FIG. 4 is a front plan view of the electrical wiring device of FIG. 1 according to an illustrative embodiment of the present disclosure.

Referring to FIGS. 2, 5 and 6, the base 14 and yoke 16 support the one or more wiring terminals that provide terminations for electrical conductors providing electrical power to the electrical wiring device 10. According to an embodiment of the present disclosure, the electrical wiring device has three wiring terminals, a line phase terminal 50, a neutral terminal 52 and a ground terminal 54. The base 14 also includes an open central portion 56 which when combined with the open central portion 26 of the cover 12 form the interior chamber configured to support the internal components of the electrical wiring device. For example, in the exemplary embodiment of FIG. 1, the electrical wiring device is a USB charger, and thus the interior chamber supports the USB charging assembly including the connectors and electrical circuitry for the USB charger. Power to the electrical circuitry for the USB charger is provided via the wiring terminals. If the electrical wiring device were a receptacle, the interior chamber would support a set of female connector members, for example, female binding terminals (not shown), that would be capable of engaging the prongs of a male plug inserted through the cover 12 and into the female connector members. The female connector members would be electrically connected to the wiring terminals, such that power from electrical distribution system conductors connected to the wiring terminals would be available at the female connector members to provide power to the plug inserted into the receptacle. An example of a receptacle with female connector members is described in U.S. Pat. No. 4,271,337, which is incorporated herein in its entirety by reference. If the electrical wiring device were a switch, the interior chamber would support a switch assembly that includes for example a toggle arm that extends through the cover 12, bumpers, springs and electrical switch contacts that would be electrically connected to the wiring terminals.

Figure 9:
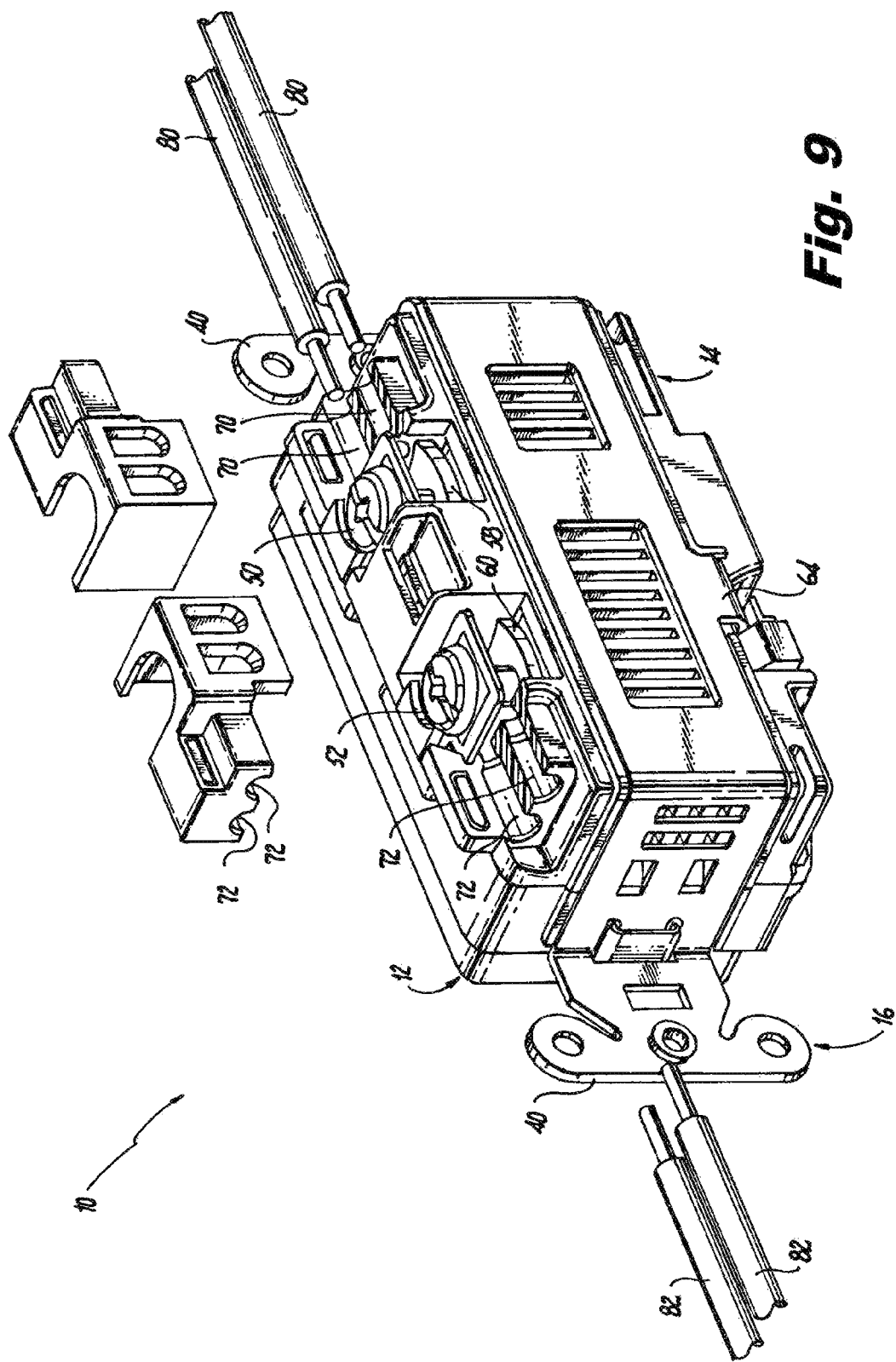
FIG. 9 is a perspective view of the first side of the electrical wiring device of FIG. 1, with portions removed to illustrate multiple longitudinal electrical conductor entries for connection of hot conductors to a line phase wiring terminal and multiple longitudinal electrical conductor entries for connection of neutral conductors to a neutral wiring terminal according to an illustrative embodiment of the present disclosure.
Figure 10:
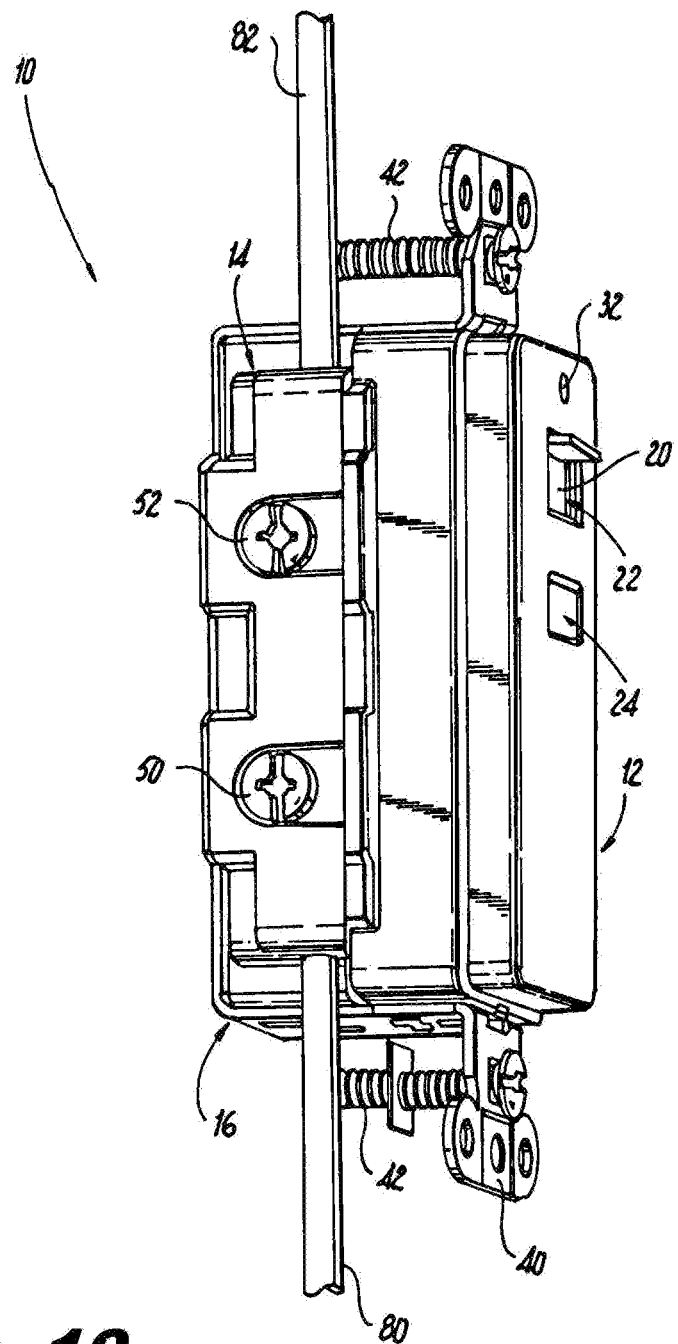
FIG. 10 is a perspective view of the electrical wiring device of FIG. 1, illustrating a line phase conductor in a longitudinal connection with a line phase wiring terminal, and a neutral conductor in a longitudinal connection with a neutral wiring terminal according to an illustrative embodiment of the present disclosure.

As noted above, in an exemplary embodiment disclosed herein the electrical wiring device has three wiring terminals, a line phase terminal 50, a neutral terminal 52 and a ground terminal 54, and the wiring terminals are binding screws. The line phase terminal 50 and neutral terminal 52 are positioned on one side of the electrical wiring device, and are secured within channels 58 and 60 respectively in the base 14, as shown in FIG. 9. The ground wiring terminal 54 is secured within channel 62 in the base 14, as shown in FIG. 2. The ground wiring terminal 54 is part of flange 64 of yoke 16 (FIGS. 2 and 9). It should be noted that binding screws are exemplary of the types of wiring terminals that can be used to provide electrical connections between the electrical distribution system conductors and the electrical wiring devices. Examples of other types of wiring terminals include set screws, pressure clamps, pressure plates, push-in type connections, pigtails and quick-connect tabs.

Figure 8:
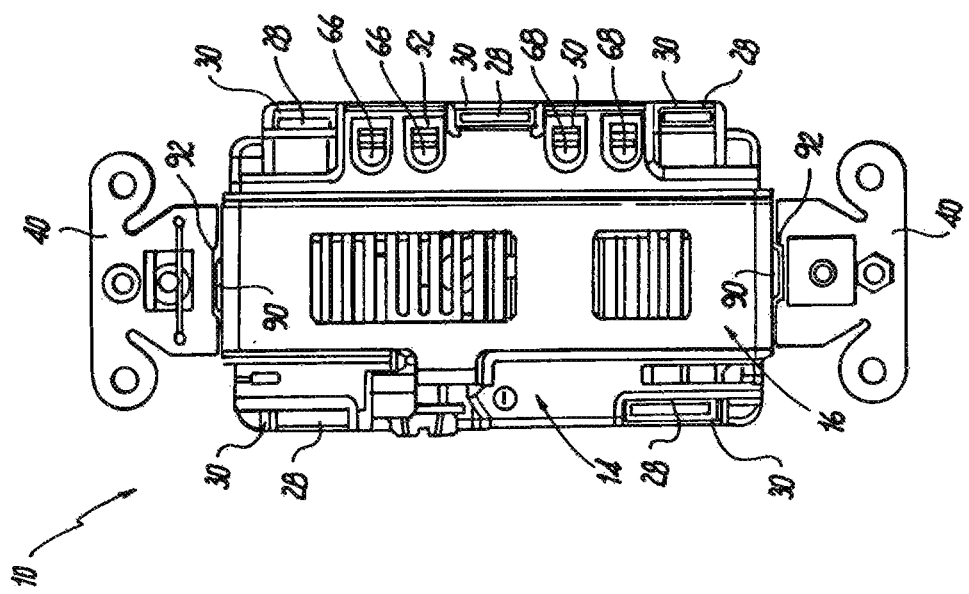
FIG. 8 is a rear plan view of the electrical wiring device of FIG. 1 according to an illustrative embodiment of the present disclosure.

Referring to FIGS. 2 and 8, the yoke 16, also referred to as a mounting strap, extends from the cover 12 at the top of the electrical wiring device 10, wraps around the perimeter of the base 14, and extends along to the cover 12 at the bottom of the electrical wiring device 10. The yoke 16 helps to secure the cover 12 to the base 14, and provides finishing ears 40 and mounting screws 42 to secure the electrical wiring device 10 to an electrical device box (not shown) when installed. The yoke 16 includes a pair of tabs 90 configured to mate with pockets 92 in cover 12, and slots 94 configured to mate with projections 96 in base 14. As noted above, when the cover 12 is connected to the base 14, snap projections 28 and recesses 30 at least partially secure the cover to the base. Further, when the cover 12 is connected to the base 14, and then the base is positioned within the yoke 16, the tabs 90 fit within pockets 92 and the projections 96 snap fit within the slots 94 to further secure the cover and base together and to the yoke 16.

Figure 7:
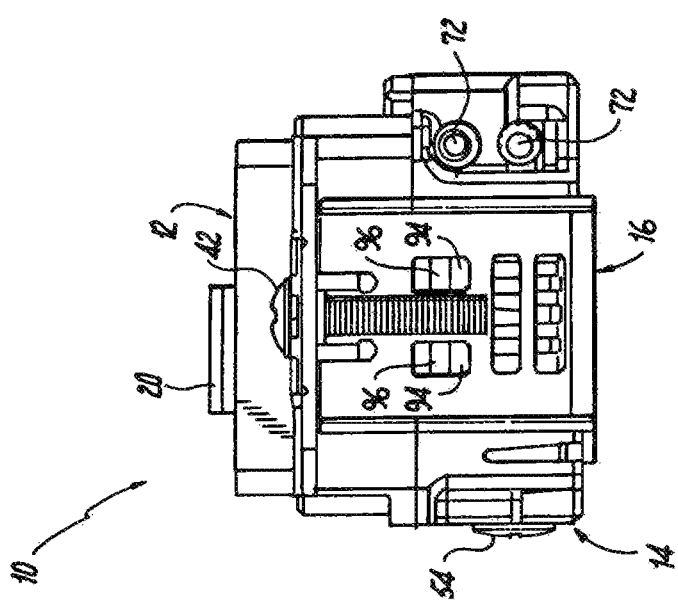
FIG. 7 is a view from the top of the electrical wiring device of FIG. 1, illustrating longitudinal electrical conductor entries according to an illustrative embodiment of the present disclosure.
Figure 11:
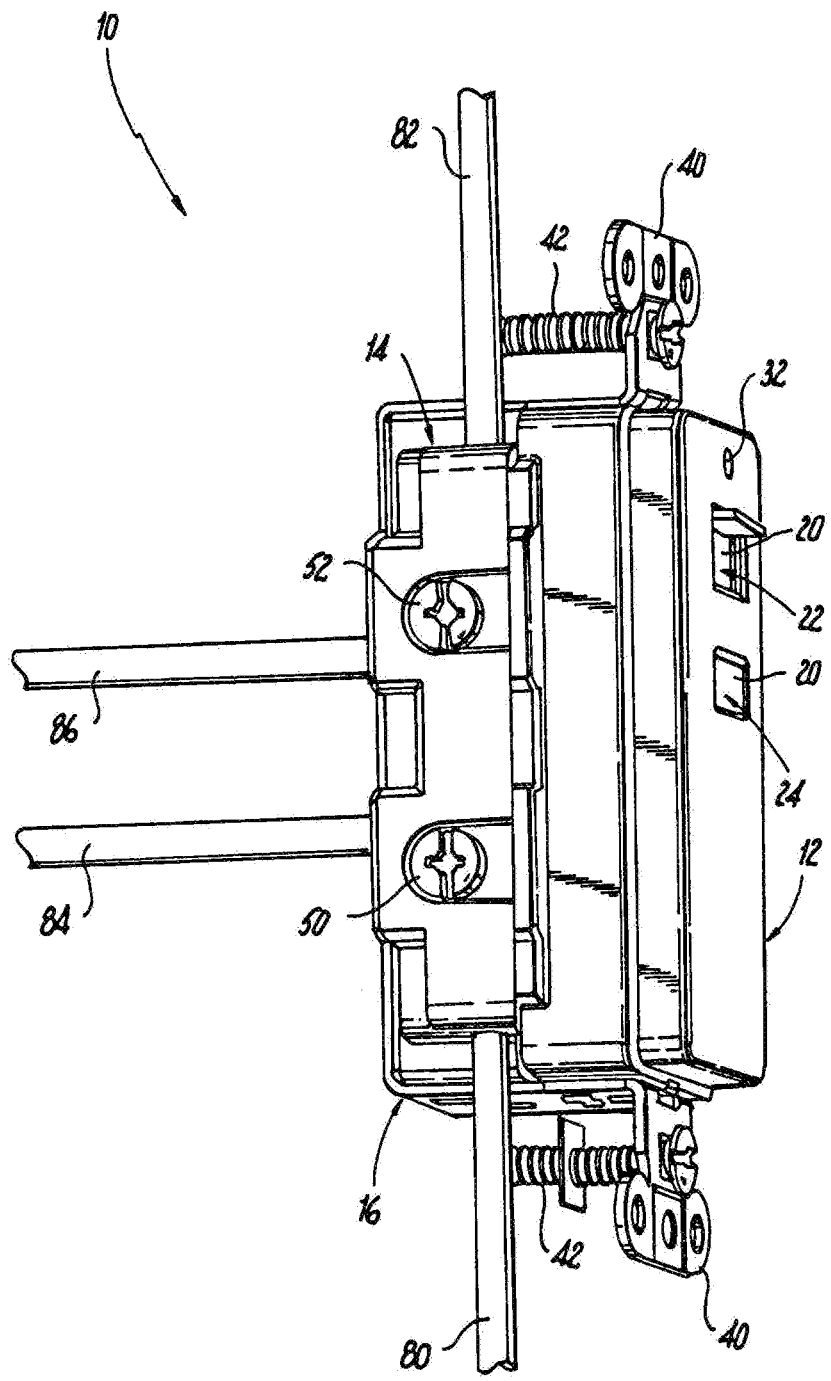
FIG. 11 is a perspective view of the electrical wiring device similar to FIG. 10, and further illustrating a line phase conductor in a perpendicular connection with the line phase wiring terminal, and a neutral conductor in a perpendicular connection with a neutral wiring terminal according to an illustrative embodiment of the present disclosure.

Referring to FIGS. 7 and 9, the longitudinal electrical conductor entries according to an embodiment of the present disclosure will be described. As shown, the base 14 can have one or more longitudinal electrical conductor entries 70 for the line phase wiring terminal, and one or more longitudinal electrical conductor entries 72 for the neutral wiring terminal. According to the illustrative embodiment of the present disclosure as depicted in FIG. 9, the longitudinal electrical conductor entries 70 for the line phase wiring terminal are elongated apertures extending along the longitudinal axis through the base 14 from the channel 58 toward the bottom surface of the electrical wiring device 10, as shown in FIG. 9. The longitudinal electrical conductor entries 70 are positioned within the base so that one or more electrical conductors 80 (hot conductors) inserted into longitudinal electrical conductor entries 70 from the bottom surface of the electrical wiring device 10 can be positioned for a secured connection to the wiring terminal 50. Similarly, the longitudinal electrical conductor entries 72 for the neutral wiring terminal are elongated apertures extending along the longitudinal axis through the base 14 from the channel 60 toward the top surface of the electrical wiring device 10, as shown in FIG. 9. The longitudinal electrical conductor entries 72 are positioned within the base so that one or more electrical conductors 82 (neutral conductors) inserted into longitudinal electrical conductor entries 72 from the top surface of the electrical wiring device 10 can be positioned for a secured connection to the wiring terminal 52. Referring to FIG. 8, the base 14 can also include perpendicular electrical conductor entries 66 and 68 for the line phase and neutral wiring terminal connections, respectively. In such a configuration, a line phase conductor 84 can be connected to the wiring terminal 50, and a neutral conductor 86 can be connected to the wiring terminal 52, as seen in FIG. 11.

Figure 12:
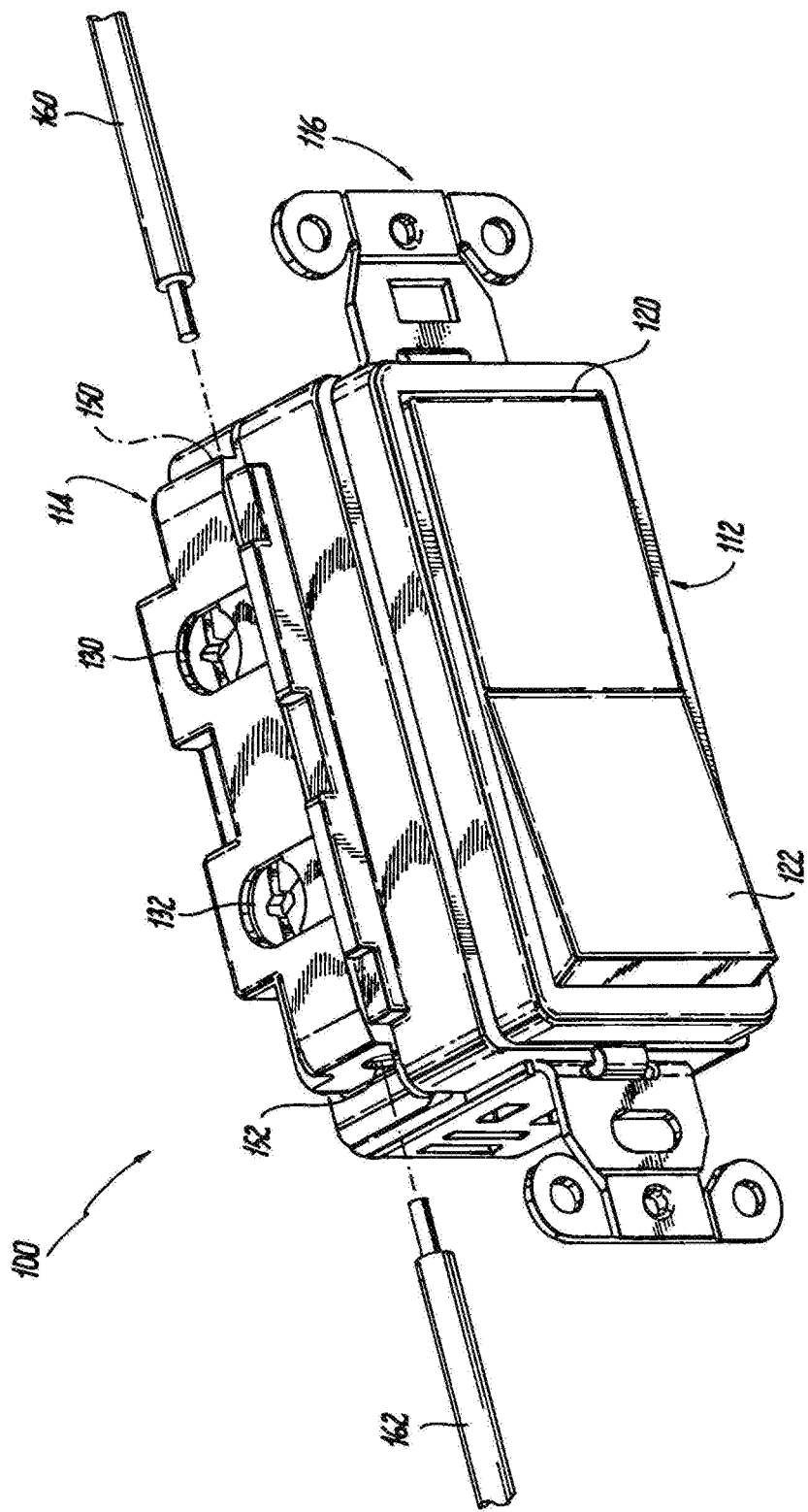
FIG. 12 is a side perspective view of an exemplary embodiment of a decorator switch as an electrical wiring device according to an illustrative embodiment of the present disclosure.
Figure 13:
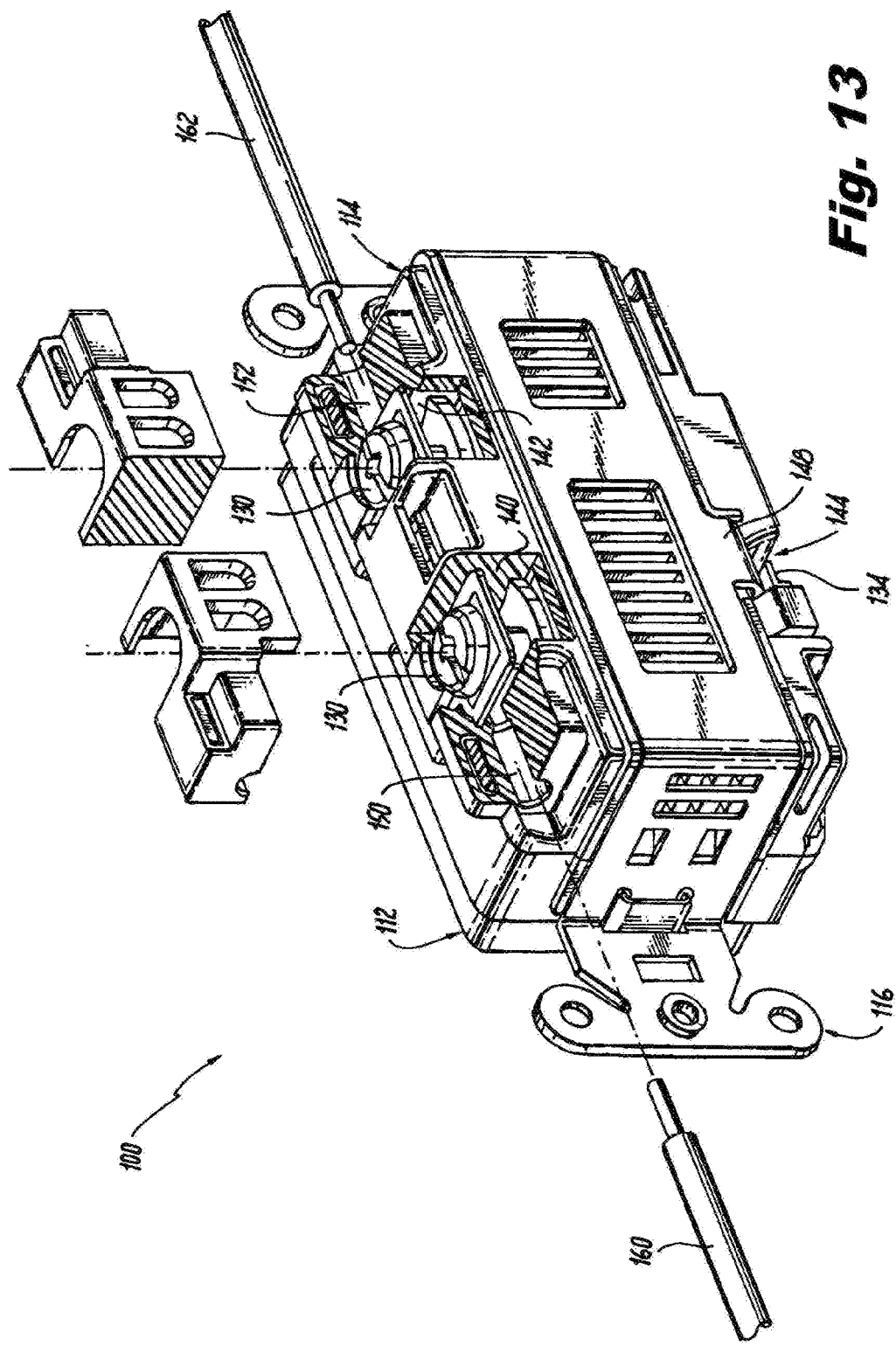
FIG. 13 is a perspective view of a first side of the electrical wiring device of FIG. 12 with portions removed to illustrate a single longitudinal entry for connection of a hot conductor to a line phase wiring terminal, and a single longitudinal entry for connection of a neutral conductor to a neutral wiring terminal according to an illustrative embodiment of the present disclosure.

Referring to FIGS. 12 and 13, an electrical wiring device according to another illustrative embodiment of the present disclosure is shown. In this embodiment, the electrical wiring device is a decorator switch 100 with longitudinal electrical conductor entries. The electrical wiring device 100 includes a cover 112, a base 114 and a yoke 116 which is substantially similar to the yoke 16 described above. The face of cover 112 has an opening 120 for the toggle arm 122 of the switch assembly positioned within an interior chamber to pass through the cover. The cover 112 also has an open central interior portion similar to the open central interior portion described above that forms in part the interior chamber that houses the internal components of the electrical wiring device, here the decorator switch, and will be described in more detail below. Similar to the embodiment described above, the cover 112 may have one or more snap projections configured to engage corresponding recesses in base 114 such that when snap projections are fully inserted into recesses, the cover 112 is at least partially secured to the base 114.

The base 114 supports the one or more wiring terminals that provide terminations for electrical conductors providing electrical power to the electrical wiring device 100. In the embodiment disclosed herein, the electrical wiring device has three wiring terminals, a line phase terminal 130, a load phase terminal 132 and a ground terminal 134. Similar to the embodiment described above, the base 114 also includes an open central portion which when combined with the open central portion of the cover 112 form the interior chamber configured to support the internal components of the electrical wiring device. For example, in the exemplary embodiment of FIGS. 12 and 13, the electrical wiring device is a decorator switch, and thus the interior chamber supports the switch assembly that includes, for example, a toggle arm 122 that extends through the cover 112, bumpers, springs and electrical switch contacts that would be electrically connected to the wiring terminals. Such switch assemblies are known in the art.

As noted above, in an exemplary embodiment disclosed herein the electrical wiring device has three wiring terminals, a line phase terminal 130, a load phase terminal 132 and a ground terminal 134, and the wiring terminals are binding screws. The line phase terminal 130 and neutral terminal 132 are positioned on one side of the electrical wiring device 100, and are secured within channels 140 and 142 respectively in the base 114, as shown in FIG. 13. The ground wiring terminal 134 is secured within channel 144 in the base 114. The ground wiring terminal 134 is part of flange 148 of yoke 116. As noted above, the use of binding screws as the wiring terminals is exemplary of the types of wiring terminals that can be used to provide electrical connections between the electrical distribution system conductors and the electrical wiring devices. Examples of other types of wiring terminals include set screws, pressure clamps, pressure plates, push-in type connections, pigtails, quick-connect tabs, etc.

In this embodiment, the base 114 can have one or more longitudinal electrical conductor entries 150 for the line phase wiring terminal, and one or more longitudinal electrical conductor entries 152 for the load phase wiring terminal. The embodiment shown in FIG. 13, illustrates one line phase longitudinal electrical conductor entry 150 and one load phase longitudinal electrical conductor entry. In this exemplary embodiment, the longitudinal electrical conductor entries 150 for the line phase wiring terminal are elongated apertures extending along the longitudinal axis through the base 114 from the channel 140 toward the top surface of the electrical wiring device 100, as shown in FIG. 13. The longitudinal electrical conductor entries 150 are positioned within the base so that one or more electrical conductors 160 inserted into longitudinal electrical conductor entries 150 from the top surface of the electrical wiring device 100 can be positioned for a secured connection to the wiring terminal 130. Similarly, the longitudinal entries 152 for the load phase wiring terminal are elongated apertures extending along the longitudinal axis through the base 114 from the channel 142 toward the bottom surface of the electrical wiring device 100, as shown in FIG. 13. The longitudinal electrical conductor entries 152 are positioned within the base so that one or more electrical conductors 162 inserted into longitudinal electrical conductor entries 152 from the bottom surface of the electrical wiring device 100 can be positioned for a secured connection to the wiring terminal 132.

Figure 14:
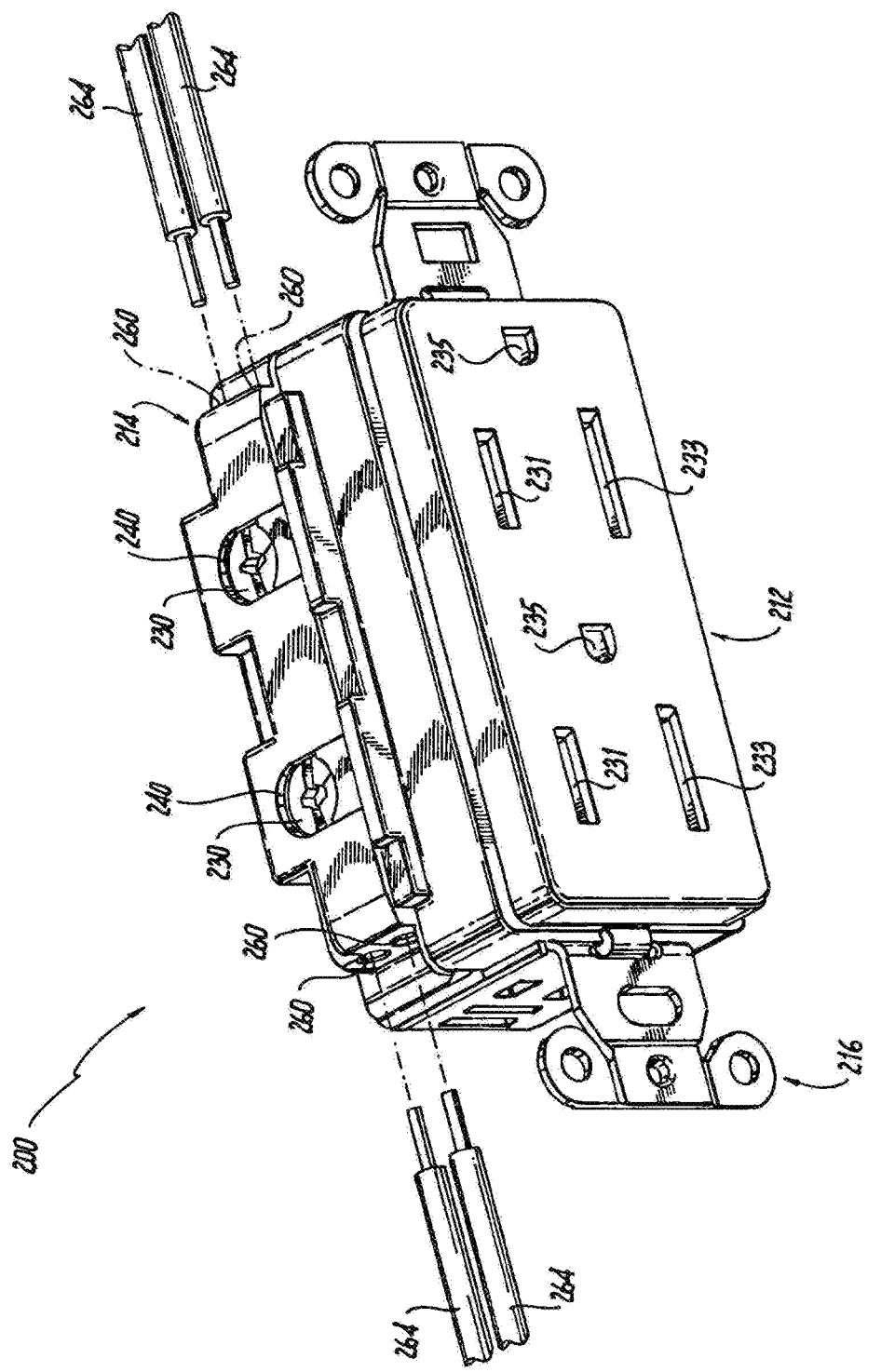
FIG. 14 is a side perspective view of an exemplary embodiment of a duplex receptacle as an electrical wiring device according to the present disclosure according to an illustrative embodiment of the present disclosure.
Figure 15:
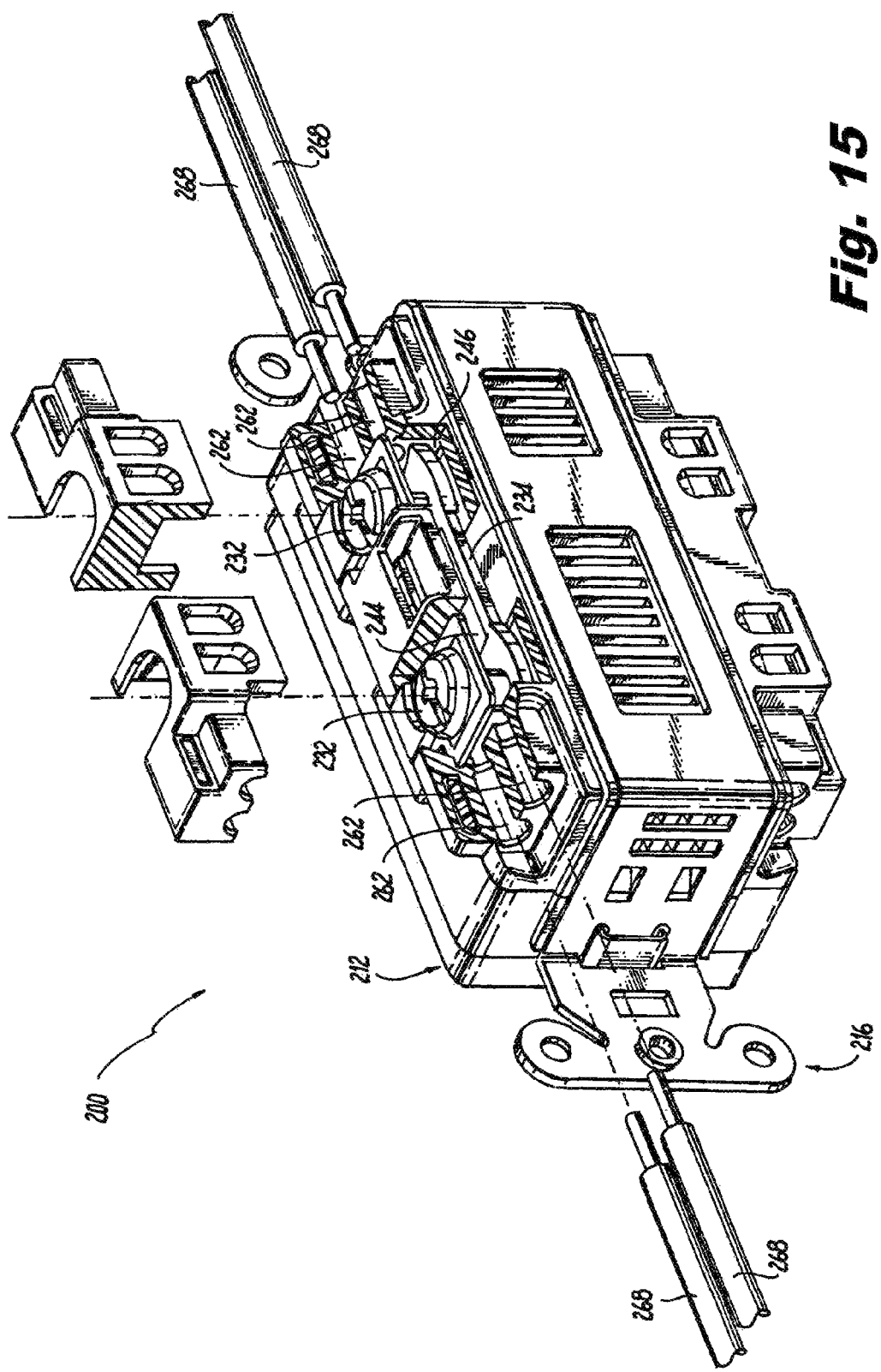
FIG. 15 is a perspective view of the first side of the electrical wiring device of FIG. 14, illustrating multiple longitudinal entries for connection of multiple neutral conductors to neutral wiring terminals according to an illustrative embodiment of the present disclosure.

An electrical wiring device according to another illustrative embodiment of the present disclosure is shown in FIGS. 14 and 15. In this embodiment, the electrical wiring device is a duplex receptacle 200 with longitudinal electrical conductor entries. The duplex receptacle 200 includes a cover 212, a base 214 and a yoke 216 which is substantially similar to the yoke 16 described above. The face of cover 212 has apertures or slots 231, 233 configured to receive the blades of a plug and apertures 235 to receive the ground prong of a plug. Similar to the embodiments described above, the cover 212 also has an open central interior portion that forms in part the interior chamber that houses the internal components of the electrical wiring device, here the duplex receptacle, and will be described in more detail below. Similar to the embodiments described above, the cover 212 may also have one or more snap projections configured to engage corresponding recesses in base 214 such that when snap projections are fully inserted into recesses, the cover 212 is at least partially secured the base 214.

The base 214 supports the one or more wiring terminals that provide terminations for electrical conductors providing electrical power to the electrical wiring device 200. In the embodiment disclosed herein, the electrical wiring device has five wiring terminals, two line phase terminals 230 electrically interconnected by abridge similar to the bridge 234 seen in FIG. 15, two neutral terminals 232 electrically interconnected by bridge 234, and a ground terminal (not shown). The base 214 also includes an open central interior portion similar to the open central interior portion described with respect to the above embodiments, which when combined with the open central portion of the cover 212 form the interior chamber configured to support the internal components of the electrical wiring device. For example, in the exemplary embodiment of FIGS. 14 and 15, the electrical wiring device is a duplex receptacle, and thus the interior chamber supports two sets of female connector members— one set for each receptacle. The female connector members may be, for example, female binding terminals (not shown), that would be capable of engaging the prongs of a male plug inserted through the cover 212 and into the female connector members. The female connector members would be electrically connected to the wiring terminals, such that power from electrical distribution system conductors connected to the wiring terminals would be available at the female connector members to provide power to the plug inserted into the receptacle. Such female binding terminals are known in the art.

As noted above, in this exemplary embodiment the electrical wiring device has five wiring terminals, two line phase terminals 230, two neutral terminals 232 and a ground terminal, and the wiring terminals are binding screws. The line phase terminals 230 are positioned on one side of the electrical wiring device (seen in FIG. 14), and are secured within channels 240 and 242 in the base 214. The two neutral terminals 232 are positioned on the other side of the electrical wiring device, and are secured within channels 244 and 246 in the base 214, as shown in FIG. 15. The ground wiring terminal (not shown) is generally part of the yoke 216. As noted above, the use of binding screws as the wiring terminals is exemplary of the types of wiring terminals that can be used to provide electrical connections between the electrical distribution system conductors and the electrical wiring devices. Examples of other types of wiring terminals include set screws, pressure clamps, pressure plates, push-in type connections, pigtails and quick-connect tabs, etc.

According to the present embodiment, the base 214 can have one or more longitudinal electrical conductor entries 260 for the line phase wiring terminals (FIG. 14), and one or more longitudinal electrical conductor entries 262 for the neural wiring terminals (FIG. 15). The embodiment shown in FIGS. 14 and 15 illustrates four line phase longitudinal electrical conductor entries and four neutral longitudinal electrical conductor entries. In this exemplary embodiment, the longitudinal electrical conductor entries 260 for the line phase wiring terminals are elongated apertures, where two longitudinal electrical conductor entries extend along the longitudinal axis through the base 214 from the channel 240 toward the top surface of the electrical wiring device 200, and where two longitudinal electrical conductor entries extend along the longitudinal axis through the base 214 from the channel 242 toward the bottom surface of the electrical wiring device 200, as shown in FIG. 14. The longitudinal electrical conductor entries 260 are positioned within the base so that one or more electrical conductors 264 inserted into longitudinal electrical conductor entries 260 from the top and bottom surfaces of the electrical wiring device 200 can be positioned for a secured connection to the wiring terminals 230. Similarly, the longitudinal electrical conductor entries 262 for the neutral wiring terminals are elongated apertures, where two longitudinal electrical conductor entries extend along the longitudinal axis through the base 214 from the channel 244 toward the top surface of the electrical wiring device 200, and where two longitudinal electrical conductor entries extend along the longitudinal axis through the base 214 from the channel 246 toward the bottom surface of the electrical wiring device 200, as shown in FIG. 15. The longitudinal electrical conductor entries 262 are positioned within the base so that one or more electrical conductors 268 inserted into longitudinal wiring entries 260 from the top and bottom surfaces of the electrical wiring device 200 can be positioned for a secured connection to the wiring terminals 232.

By using electrical wiring devices with longitudinal conductor entries as disclosed herein, the electrical wiring devices can be easily wired and secured to device boxes and electrical raceways having minimal depths, while minimizing compression and sharp bends of electrical conductors connected to the electrical wiring devices.

It will be understood that various modifications can be made to the embodiments of the present disclosure without departing from the spirit and scope thereof. Therefore, the above description should not be construed as limiting the disclosure, but merely as embodiments thereof. Those skilled in the art will envision other modifications within the scope and spirit of the invention as defined by the claims appended hereto. For example, the electrical wiring devices contemplated by the present disclosure that may be configured with the longitudinal entries for connecting electrical conductors to the wiring terminals can include receptacles, switches, circuit interrupters (e.g., ground fault circuit interrupters and arc fault circuit interrupters), transient surge suppressors (e.g., transient voltage surge suppressors), occupancy sensors, dimmers, timers, low voltage devices, including the USB charger disclosed herein, and combinations of the different devices, such as a combination receptacle and USB charger, a combination receptacle, switch and USB charger, and a combination receptacle and switch. The types of wiring terminals contemplated by the present disclosure include binding screws, set screws, pressure clamps, pressure plates, push-in type connections, pigtails, quick-connect tabs and other known wiring terminals. And, the longitudinal entries contemplated by the present disclosure can include apertures, notches, channels, recesses and any other pathway for one or more conductors to pass along the longitudinal axis of the electrical wiring device to connect to one or more wiring terminals.

What is claimed is:

1. An electrical wiring device for installation into an electrical box, the electrical wiring device comprising:
   a cover including an open central interior portion to house internal components of the electrical wiring device;
   a base having a longitudinal axis extending between a top surface and a bottom surface, the base including:
   at least one line phase wiring terminal;
   at least one neutral wiring terminal;
   at least one line phase electrical conductor entry extending along the longitudinal axis of the base and extending between the line phase wiring terminal and the top surface or the bottom surface of the base; and
   at least one neutral electrical conductor entry extending along the longitudinal axis of the base and extending between the neutral wiring terminal and the top surface or the bottom surface of the base; and
   a yoke coupled at least to the base and used to secure the electrical wiring device to the electrical box.

2. The electrical wiring device according to claim 1, wherein the at least one line phase electrical conductor entry extends between the line phase wiring terminal and the bottom surface of the base.

3. The electrical wiring device according to claim 1, wherein the at least one neutral electrical conductor entry extends between the neutral wiring terminal and the top surface of the base.

4. The electrical wiring device according to claim 1, wherein the at least one line phase electrical conductor entry comprises two line phase electrical conductor entries.

5. The electrical wiring device according to claim 1, wherein the at least one neutral electrical conductor entry comprises two neutral electrical conductor entries.

6. The electrical wiring device according to claim 1, wherein the electrical wiring device comprises a low voltage device.

7. The electrical wiring device according to claim 6, wherein the low voltage device comprises a USB charger.

8. The electrical wiring device according to claim 1, wherein the electrical wiring device comprises a receptacle.

9. The electrical wiring device according to claim 8, wherein the receptacle comprises a duplex receptacle.

10. The electrical wiring device according to claim 1, wherein the electrical wiring device comprises a ground fault circuit interrupter.

11. The electrical wiring device according to claim 1, wherein the electrical wiring device comprises an arc fault circuit interrupter.

12. The electrical wiring device according to claim 1, wherein the at least one line phase wiring terminal, the at least one neutral wiring terminal, the at least one line phase electrical conductor entry and the at least one neutral electrical conductor are disposed on the base.

13. The electrical wiring device according to claim 1, wherein the yoke extends from one portion of the cover around an outer surface of the base to another portion of the cover, and wherein the yoke is snap fitted to the cover and base to at least partially secure the cover to the base.

14. The electrical wiring device according to claim 13, wherein the yoke has a ground wiring terminal.

15. An electrical wiring device for installation into an electrical device box, the electrical wiring device having a longitudinal axis extending between a top surface and a bottom surface, the electrical wiring device comprising:
a cover including an open central interior portion to house internal components of the electrical wiring device;
a base including:
 a plurality of wiring terminals; and
 a plurality of electrical conductor entries extending along the longitudinal axis of the electrical wiring device, wherein at least one of the plurality of electrical conductor entries extends between one of the plurality of wiring terminals and the top surface, and wherein at least one of the plurality of electrical conductor entries extends between one of the plurality of wiring terminals and the bottom surface; and
a yoke coupled at least to the base and used to secure the electrical wiring device to the electrical box.

16. The electrical wiring device according to claim 15, wherein the plurality of wiring terminals comprise line phase and load phase wiring terminals.

17. The electrical wiring device according to claim 15, wherein the plurality of wiring terminals comprise line phase and neutral wiring terminals.

18. The electrical wiring device according to claim 15, wherein the plurality of electrical conductor entries comprise at least one line phase electrical conductor entry and at least one load phase electrical conductor entry.

19. The electrical wiring device according to claim 15, wherein the plurality of electrical conductor entries comprise at least one line phase electrical conductor entry and at least one neutral electrical conductor entry.

20. The electrical wiring device according to claim 15, wherein the plurality of electrical conductor entries comprise a plurality of line phase electrical conductor entries and a plurality of load phase electrical conductor entries.

21. The electrical wiring device according to claim 20 wherein the plurality of line phase electrical conductor entries comprise two line phase electrical conductor entries.

22. The electrical wiring device according to claim 20 wherein the plurality of load phase electrical conductor entries comprise two load phase electrical conductor entries.

23. The electrical wiring device according to claim 15, wherein the plurality of electrical conductor entries comprise a plurality of line phase electrical conductor entries and a plurality of neutral electrical conductor entries.

24. The electrical wiring device according to claim 23 wherein the plurality of line phase electrical conductor entries comprise two line phase electrical conductor entries.

25. The electrical wiring device according to claim 23 wherein the plurality of neutral electrical conductor entries comprise two neutral electrical conductor entries.

26. The electrical wiring device according to claim 15, wherein the electrical wiring device comprises a low voltage device.

27. The electrical wiring device according to claim 26, wherein the low voltage device comprises a USB charger.

28. The electrical wiring device according to claim 15, wherein the electrical wiring device comprises a receptacle.

29. The electrical wiring device according to claim 28, wherein the receptacle comprises a duplex receptacle.

30. The electrical wiring device according to claim 15, wherein the electrical wiring device comprises a switch.

31. The electrical wiring device according to claim 15, wherein the electrical wiring device comprises a ground fault circuit interrupter.

32. The electrical wiring device according to claim 15, wherein the electrical wiring device comprises an arc fault circuit interrupter.

33. The electrical wiring device according to claim 15, wherein the plurality of wiring terminals and the plurality of electrical conductor entries are disposed on the base.

34. The electrical wiring device according to claim 15, wherein the yoke extends from one portion of the cover around an outer surface of the base to another portion of the cover, and wherein the yoke is snap fitted to the cover and base to at least partially secure the cover to the base.

35. The electrical wiring device according to claim 34, wherein the yoke has a ground wiring terminal.

* * * * *